United States Patent
Barr et al.

(10) Patent No.: US 9,535,794 B2
(45) Date of Patent: Jan. 3, 2017

(54) MONITORING HIERARCHICAL CONTAINER-BASED SOFTWARE SYSTEMS

(71) Applicant: GLOBALFOUNDRIES INC., Grand Cayman (KY)

(72) Inventors: Arthur J. Barr, Swindon (GB); Stuart J. Hayton, Portsmouth (GB); Robert B. Nicholson, Southsea (GB); Colin J. Thorne, Southampton (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 128 days.

(21) Appl. No.: 13/951,528

(22) Filed: Jul. 26, 2013

(65) Prior Publication Data

US 2015/0033072 A1 Jan. 29, 2015

(51) Int. Cl.
*G06F 11/14* (2006.01)
*G06F 11/07* (2006.01)

(52) U.S. Cl.
CPC ....... *G06F 11/1438* (2013.01); *G06F 11/0706* (2013.01); *G06F 11/0757* (2013.01); *G06F 11/1484* (2013.01)

(58) Field of Classification Search
CPC H04L 69/40; G06F 11/1438; G06F 17/30327; G06F 11/00; G06F 11/0757
See application file for complete search history.

(56) References Cited

U.S. PATENT DOCUMENTS

| | | | | |
|---|---|---|---|---|
| 6,728,781 B1* | 4/2004 | Aguilera et al. | | 709/240 |
| 6,891,801 B1* | 5/2005 | Herzog | | 370/237 |
| 7,120,688 B1* | 10/2006 | Nguyen | | H04L 43/10 |
| | | | | 709/224 |
| 7,287,180 B1* | 10/2007 | Chen et al. | | 714/4.3 |
| 7,353,259 B1* | 4/2008 | Bakke | | G06F 9/44505 |
| | | | | 709/208 |
| 7,546,625 B1* | 6/2009 | Kamangar | | G06Q 30/02 |
| | | | | 725/116 |
| 7,877,783 B1* | 1/2011 | Cline et al. | | 726/2 |

(Continued)

FOREIGN PATENT DOCUMENTS

| | | |
|---|---|---|
| EP | 1753182 A1 | 2/2007 |
| EP | 2317699 A1 | 5/2011 |
| WO | 2012016175 A1 | 2/2012 |

OTHER PUBLICATIONS

Bansal et al. "Adaptive Staircase Multiple Failure Detector for Parallel and Distributed Image Processing," 1st International Conference on Recent Advances in Information Technology | RAIT-2012|, Mar. 15-17, 2012, copyright 2012 IEEE.

(Continued)

*Primary Examiner* — Loan L. T. Truong
(74) *Attorney, Agent, or Firm* — Scully, Scott, Murphy & Presser, PC

(57) ABSTRACT

A computer receives a heartbeat message that includes both program reset information and at least one segment, of the heartbeat message, that is configured to indicate whether or not a first program is functioning correctly. The computer determines if the heartbeat message includes the indication that the first program is functioning correctly. If the computer determines that the heartbeat message indicates that the first program is functioning correctly, then the computer sends a data stream to the first program.

25 Claims, 5 Drawing Sheets

(56) References Cited

U.S. PATENT DOCUMENTS

| | | | |
|---|---|---|---|
| 8,065,411 B2* | 11/2011 | Spiess | H04L 12/2602 707/944 |
| 8,156,219 B2 | 4/2012 | Qiu et al. | |
| 9,178,772 B2* | 11/2015 | Dasgupta | H04L 41/145 |
| 2002/0174207 A1* | 11/2002 | Battou | G06F 8/65 709/223 |
| 2003/0179742 A1* | 9/2003 | Ogier et al. | 370/351 |
| 2003/0212738 A1* | 11/2003 | Wookey | H04L 12/5875 709/203 |
| 2005/0007964 A1* | 1/2005 | Falco | H04L 29/06 370/256 |
| 2006/0020707 A1* | 1/2006 | Undery et al. | 709/230 |
| 2006/0069702 A1* | 3/2006 | Moeller | G06F 9/542 |
| 2006/0235847 A1* | 10/2006 | Farlee | G06F 11/1466 |
| 2007/0041327 A1* | 2/2007 | Foster et al. | 370/242 |
| 2007/0244987 A1* | 10/2007 | Pedersen | H04L 63/0272 709/217 |
| 2007/0283002 A1* | 12/2007 | Bornhoevd | G06F 9/54 709/224 |
| 2008/0163212 A1* | 7/2008 | Zimmer et al. | 718/100 |
| 2009/0052466 A1 | 2/2009 | Khalid et al. | |
| 2009/0085769 A1* | 4/2009 | Thubert | H04L 45/04 340/870.07 |
| 2009/0322518 A1* | 12/2009 | Liang | H04L 45/48 340/539.18 |
| 2010/0199128 A1* | 8/2010 | Coppinger | G06F 11/1438 714/19 |
| 2011/0010706 A1* | 1/2011 | Lambert et al. | 718/1 |
| 2011/0170452 A1 | 7/2011 | Monsarrat-Chanon et al. | |
| 2011/0173251 A1* | 7/2011 | Sandhu | G06F 8/61 709/203 |
| 2011/0258682 A1* | 10/2011 | Yin | H04L 63/12 726/3 |
| 2011/0320633 A1 | 12/2011 | Burmester et al. | |
| 2012/0239825 A1* | 9/2012 | Xia | G06F 9/44505 709/250 |
| 2012/0294155 A1* | 11/2012 | Yin | H04W 24/04 370/242 |
| 2013/0011136 A1* | 1/2013 | Hao | H04Q 11/00 398/45 |
| 2013/0297934 A1* | 11/2013 | Suni | H04W 12/10 713/156 |
| 2013/0342528 A1* | 12/2013 | Lee | G06T 15/06 345/419 |
| 2014/0051485 A1* | 2/2014 | Wang | H04B 7/2656 455/574 |
| 2014/0089901 A1* | 3/2014 | Hadar | G06F 17/3089 717/127 |
| 2014/0149485 A1* | 5/2014 | Sharma | H04L 67/02 709/202 |
| 2014/0331173 A1* | 11/2014 | Minekawa | G06F 9/4443 715/803 |
| 2015/0160955 A1* | 6/2015 | Authement | G06F 17/5027 703/23 |

OTHER PUBLICATIONS

Brendel, Juergen. "Multi-cloud IP address failover with Heartbeat and vCider," Apr. 2, 2012, © vCider 2012, <http://blog.vcider.com/2012/04/multi-cloud-ip-address-failover-with-heartbeat-and-vcider/>.

Soltesz et al. "Container-based Operating System Virtualization: A Scalable, High-performance Alternative to Hypervisors," EuroSys'07, Mar. 21-23, 2007, Lisboa, Portugal.

"Two Phase Commit" provisioning of a replacement node in PaaS and IaaS systems, Authors disclosed anonymously, IP.com Prior Art Database, IPCOM000214129D, Jan. 11, 2012.

* cited by examiner

MONITORING HIERARCHICAL CONTAINER-BASED SOFTWARE SYSTEMS

FIELD OF THE INVENTION

The present invention relates generally to the field of software systems and more particularly to monitoring hierarchical container-based software systems.

BACKGROUND OF THE INVENTION

There are a wide variety of software systems that process a stream of network data. Some examples of software systems of this type include: optimizing a video data stream for a particular end device such as a smartphone that cannot display a 1080p video stream, inserting advertising into a HTTP flow between a device and a server, compressing data, optimizing HTML, etc. In all of these examples, if the application processing the stream fails, it is a reasonable thing to do to just bypass the application, passing the network flow on either without the "value" that the application adds or to have that value added by another application or system element.

In hierarchical container-based software systems, if an application fails, then two actions are typically taken. First, the data being supplied to the application is stopped or re-directed. Second, the application is recovered (e.g. restarted), if possible. There is a well known pattern for managing recovery in hierarchical software systems. The recovery (restart) should to be managed through the hierarchical container relationship. That is to say that the application server should attempt to restart the application. If the application server is unable to restart the application, then a reasonable recovery action would be to restart the application server. If that fails, the next container in the hierarchy should restart. And so the pattern of escalation of the failure escalates through the hierarchy.

SUMMARY

One embodiment of the present invention discloses a method, computer program product, and system monitoring a hierarchy of program components executing on computer hardware. A computer receives a heartbeat message that includes both program reset information and at least one segment of the heartbeat message that is configured to store an indication that a first program is functioning correctly. The computer determines if the heartbeat message includes the indication that the first program is functioning correctly. Responsive to the determination that the heartbeat message includes the indication that the first program is functioning correctly, the computer sends a data stream to the first program.

DETAILED DESCRIPTION

Figure 1:
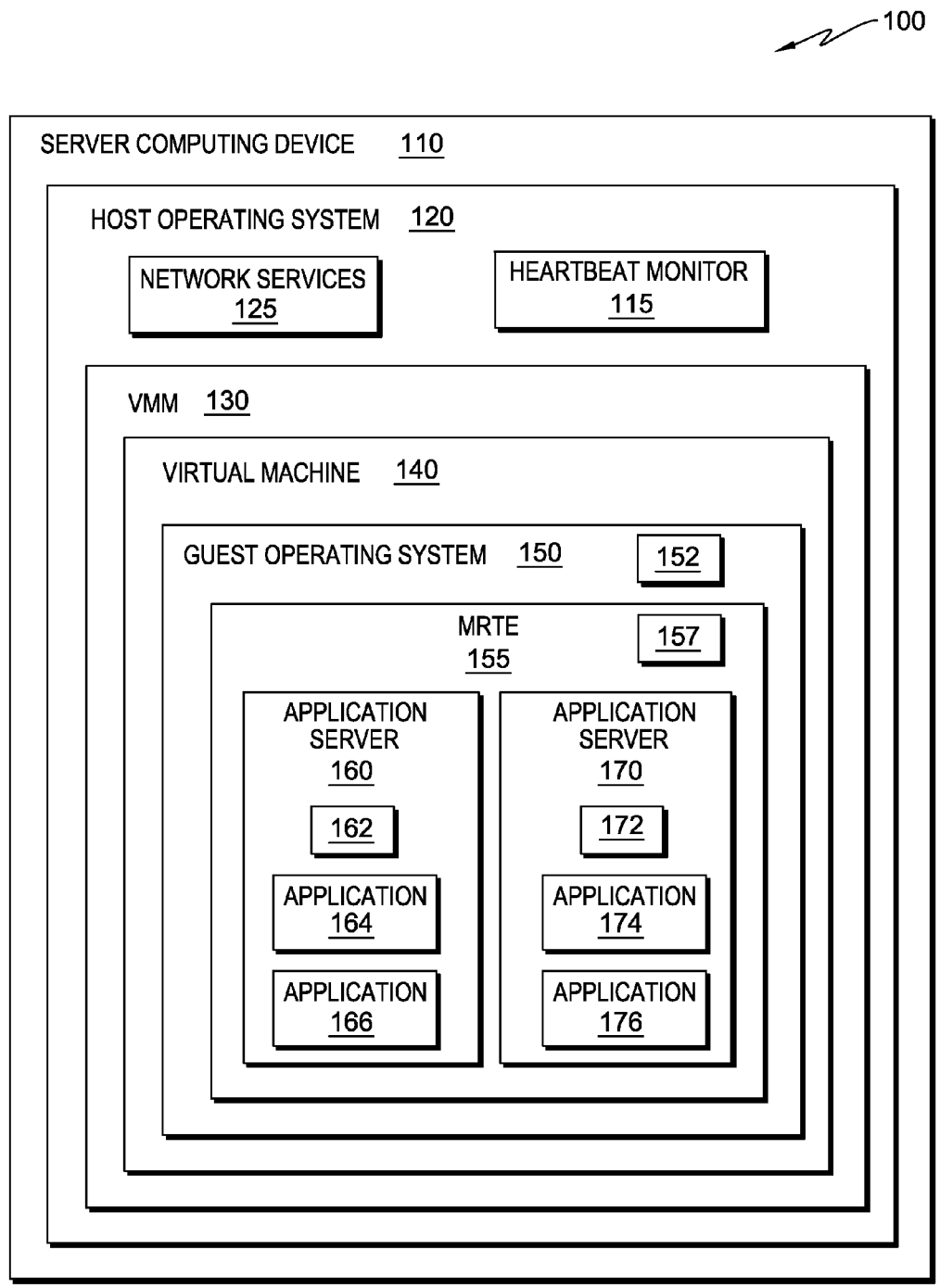
FIG. 1 is a block diagram illustrating a data processing environment, in accordance with an embodiment of the present invention.

In certain software systems, multiple virtual containers of virtualization are stacked hierarchically on top of one another. Such software systems are termed hierarchical container-based software systems. An example of such a software system is one in where a host operating system (OS) executes a virtual machine using technology such as KVM or Xen. This hosting environment can be referred to as a Virtual Machine Manager (VMM). A VMM is a piece of computer software, firmware, or hardware that creates and runs virtual machines. Within a virtual machine (VM) hosted by the VMM, is a guest operating system (OS) that, in turn, executes a managed runtime environment (MRTE), such as a Java® virtual machine (JVM). The MRTE supports an application server that in turn executes an application. This creates a containment hierarchy, for example host OS, VMM, VM, guest OS, MRTE, application server, and an application, with each successive program acting as a container for subsequent programs in the hierarchy.

A conventional scheme for monitoring, resetting and restarting an application running in a hierarchical container-based software system is to make use of a heartbeat. A heartbeat is herein defined as a periodic signal, generated by the monitored hardware or software system, which is used to indicate operation status of various components included in the hierarchical container-based software system or to synchronize components of the hierarchical container-based software system. Usually a heartbeat is sent between machines, components, or programs at regular intervals. The interval may be of the orders of seconds, milliseconds or smaller depending on the nature of the system. If a heartbeat isn't received for a defined number of heartbeat intervals, then the machine, component, or program that should have sent the heartbeat is determined to have failed. Typically, if the machine, component, or program fails to respond, then execution of that machine, component, or program is typically terminated and restarted. In the case of a program included in the hierarchy, there are multiple points from which to recover, post program termination. Typically, each container in the hierarchy will monitor its contained components. For example, a guest operating system in a virtual machine monitors a variety of programs supported by the guest OS, such as MRTEs and the applications that the MRTEs in turn monitor, and restart those applications if they fail. In addition, the VMM, which contains the virtual machine that supports the guest OS, monitors the guest OS and will reset the whole virtual machine instance if the guest OS cannot confirm that the programs the guest OS supports are running correctly or cannot adequately monitor those programs.

In the case where there are multiple applications executing inside the hierarchy, for example multiple applications running in the application servers of an MRTE, there can be problems that result in the event of a heartbeat failure of the program. For example, an application server A is executing inside a VMM. If the heartbeat to the application server, e.g. server A, fails, then the correct action is to terminate the application server, i.e., server A, inside the VMM and restart the application server, i.e., server A. However, it is to be noted that in the previous scenario that other programs executing in other application servers, e.g. server B, in the VMM remain unaffected. However, if this action, e.g., the shutdown and restart of server A, fails to resolve the problem several times, then the problem may be with the VMM and the problem should be escalated to a reset of the whole VMM. If a reset, or multiple resets, of the whole VMM fails to resolve the problem, then the host operating system in which the VMM executes should be terminated and restarted. As described, the nature of a typical program restart is fundamentally hierarchical. Typically, at each level in the hierarchy, heartbeats are monitored to take action to reset the program upon failure. If the action to reset the program does not work, then an escalation to the next hierarchy level is warranted.

If the aforementioned hierarchical container-based software system is concerned with processing streaming data, then if the application fails, in some scenarios, it can be desirable to bypass the program traffic until the program is functioning properly again. In this situation, the problem is not hierarchical. For example, a program is executing in an application server inside a MRTE executing in a VMM, which is executing in a host OS. If there is a problem with the program, then the required action in this scenario would be the same as that of a scenario where the program was executing directly in the host OS.

Typically, the aforementioned scenario would be solved using two separate heartbeat signals from a program. One heartbeat would be hierarchical and would be used to orchestrate program restart. The second heartbeat would be sent to the component streaming the data. A potential issue that may arise from the use of two separate heartbeat signals is that the heartbeats could become inconsistent if a problem occurred in the program sending the respective heartbeats. Further, since the processing of the two heartbeats is implemented in two places, i.e., the program restart and the component, this creates another point where the heartbeats could become inconsistent. The implication of this is that a program may be bypassed, i.e., not restarted, because while that program was not responding correctly to the streaming heartbeat, the program is still responding correctly to the reset heartbeat.

The present invention will now be described in detail with reference to the Figures. Exemplary embodiments of the present invention combine hierarchy structure, network bypass monitoring, and a single heartbeat to reduce program failures. The use of a single heartbeat may eliminate program failures which cause one heartbeat to fail while other heartbeats continue, which can result in a program failure that is not recovered.

Exemplary embodiments of the present invention include a network heartbeat that is tunneled over a reset heartbeat. The host operation system (OS) provides a single integrated MRTE—reset and network heartbeat. The heartbeat message is structured to have a number of slots within the heartbeat message which can contain a flow identifier that corresponds to a network flow. The heartbeat message is utilized to keep the MRTE operating and to keep all the network flows un-bypassed (i.e. any missing network flows are bypassed).

In exemplary embodiments, applications which execute natively in the guest OS, herein denoted native applications, send heartbeats to a network service executing on the host OS. The heartbeat messages of the native applications include a keep alive message for all the network flows that the native applications use. An application which executes in a virtual application server of a MRTE is herein denoted as a guest application. Guest applications utilize a guest heartbeat service. Guest applications send their respective heartbeats to the guest heartbeat service, which combines those heartbeats and passes the resulting heartbeat on to the network service, thereby combining together the flows of all executing applications executing in the MRTE. Thus, if a MRTE experiences failure then the entire network flows for the entire guest applications are bypassed, and the MRTE is restarted. In exemplary embodiments, a single set of heartbeat messages include the information for both the restart component and the network bypass component.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a data processing environment, generally designated 100, in accordance with one embodiment of the present invention. Data processing environment 100 includes server computing device 110, which includes heartbeat monitor 115. In certain embodiments, one or more of the applications and programs described herein, such as heartbeat monitor 115, can be accessed or downloaded via a network for execution on server computing device 110. The network can be, for example, a local area network (LAN), a wide area network (WAN) such as the Internet, or a combination of the two, and can include wired, wireless, or fiber optic connections. In general, the network can be any combination of connections and protocols that will support communications between server computing device 110 and heartbeat monitor 115.

Server computing device 110 may be a server computer, a laptop computer, a tablet computer, a netbook computer, a personal computer (PC), a desktop computer, a personal digital assistant (PDA), a smart phone, or any programmable electronic device capable of executing the applications or control logic as described herein. Server computing device 110 includes heartbeat monitor 115. Heartbeat monitor 115 provides a single set of heartbeat messages to combine information for both the restart and network bypass of components within data processing environment 100. Server computing device 110 may include internal and external hardware components, as depicted and described in further detail with respect to FIG. 5.

In this exemplary embodiment, server computing device 110 includes network services 125. Network services 125 routes data streams to endpoints of the applications executing on server computing device 110, when requested. Server computing device 110 includes a host operating system 120 and a heartbeat monitor 115. Host operating system 120 manages the physical hardware, acts as a software platform for low level services including, network services 125 and the VMM 130. VMM 130 supports virtual machine 140. Virtual machine 140 in turn, supports and executes the programming of guest operating system 150, which has a corresponding heartbeat monitor 152. Guest operating system 150, in turn, supports and executes the programming of MRTE 155, which includes heartbeat monitor 157. MRTE 155 executes application server 160 which includes heartbeat monitor 162, and application server 170 which includes heartbeat monitor 172.

Application server 160 executes the programming of application 164 and 166, which respectively send heartbeat signals to heartbeat monitor 162. Application server 170 executes the programming of application 174 and 176, which respectively send heartbeat signals to heartbeat monitor 172. If heartbeat monitor 162 and 172 are operating correctly and should not be reset, then heartbeat monitor 162 and 172 respectively send their heartbeat signals to heartbeat monitor 157. In general, if all components are operating normally, then the heartbeat is passed sequentially from one heartbeat monitor to the next heartbeat monitor in the hierarchical order, e.g., from 157 to 152, 152 to 115, until the heartbeat reaches the highest hierarchical heartbeat monitor (e.g., heartbeat monitor 115) which interacts with network services 125. At each level in the hierarchy, the respective heartbeat monitor resets and recovers the applications it is monitoring as needed. For example, if application 164 fails or becomes unresponsive, then heartbeat monitor 162 resets application 164. Provided heartbeat monitor 162 is operating correctly and able to manage the applications it is monitoring then heartbeat monitor 162 sends heartbeats to heartbeat monitor 157. Thus, at each level in the hierarchy, the presence of a heartbeat at a given level indicates that the respective level of the hierarchy, which has the heartbeat, is operating correctly and is not in need of reset. As the heartbeat is passed from one hierarchical level to the next, information is accumulated indicating whether the network flows consumed by applications at that level should continue to be routed to applications or should be bypassed. The information indicating whether a network flow should continue to be routed to a given application or should be bypassed is conveyed by placing the corresponding flow identifier of that network flow into the respective slot of the heartbeat that is received by heartbeat monitor 115. The presence of a flow identifier indicates that the network flow should continue to be sustained. Heartbeat monitor 115 passes the bypass information to network services 125 which uses the information included in the heartbeat to determine if one or more network flows should be bypassed.

Heartbeat monitors, such as heartbeat monitors, 115, 152, 157, 162, and 172 are software components that receive heartbeat messages and make decisions about restarting the applications or containers under their respective control.

Heartbeat monitor 115 provides a single set of heartbeat messages to combine information for both the restart and network bypass of components, including applications, within data processing environment 100. Heartbeat monitor 115 provides a network heartbeat that is tunneled over the reset heartbeat when host operating system 120 provides a single integrated reset and network heartbeat service. Heartbeat monitor 115 provides a heartbeat message that is structured with a plurality of slots, with each slot capable of carrying a flow identifier corresponding to a network flow. When the heartbeat message carries a particular flow identifier in a given slot, then this indicates that the network flow associated with that flow identifier should be kept alive, i.e., should not be bypassed. Additionally, any network flows corresponding to flow identifiers that are missing are bypassed.

In this exemplary embodiment, the guest applications, such as application 164, 166, 174, and 176, send their respective heartbeats to heartbeat monitor 162 and 172. The heartbeat message from applications include information for all the data streams (also called data flows) that the applications use. In this exemplary embodiment, heartbeat monitor 115 receives the aggregated heartbeat message from the hierarchy of heartbeat monitors and analyzes the aggregated heartbeat message to determine if any network flows need to be bypassed. Thus, if an application container of an application fails, then, regardless of the nested level, all of the flows for that application container are bypassed and the application container is restarted by the heartbeat monitor immediately below it in the hierarchy. For example, guest operating system 150 fails, therefore the data streams going to guest operating system 150 are bypassed, and guest operating system 150 and all the nested applications guest operating system 150 supports are restarted. In another example, application server 160 fails. The absence of heartbeats from application server 160 indicates to heartbeat monitor 152 that application server 160 has failed. Heartbeat monitor 152 would reset and restart application server 160. Additionally, because heartbeat monitor 152 is not receiving heartbeat messages containing the data streams used by applications 164 and 166, heartbeat monitor 152 will not pass these flows on in the messages it sends to heartbeat monitor 115. Therefore, the data streams going to application 164 and 166 would be bypassed while application server 160 is restarted. However, application server 170 and application 174 and 176 would not be restarted because the heartbeat would indicate that they are still functioning normally. In general, heartbeat monitors 152, 157, 162, and 172 aggregate flow identifiers that correspond to network data flows and add them to the heartbeat. Each heartbeat monitor is responsible for resetting and recovering the entities (e.g., components such as applications) which send it heartbeats. A parent heartbeat monitor is therefore responsible for monitoring and resetting a respective child heartbeat monitor. As with other heartbeat monitors, the bottom most heartbeat monitor (such as heartbeat monitor 115) is responsible for monitoring and resetting the components above it. However, the bottom most heartbeat monitor is also responsible for bypassing data flows and interacting with the network services.

Figure 2:
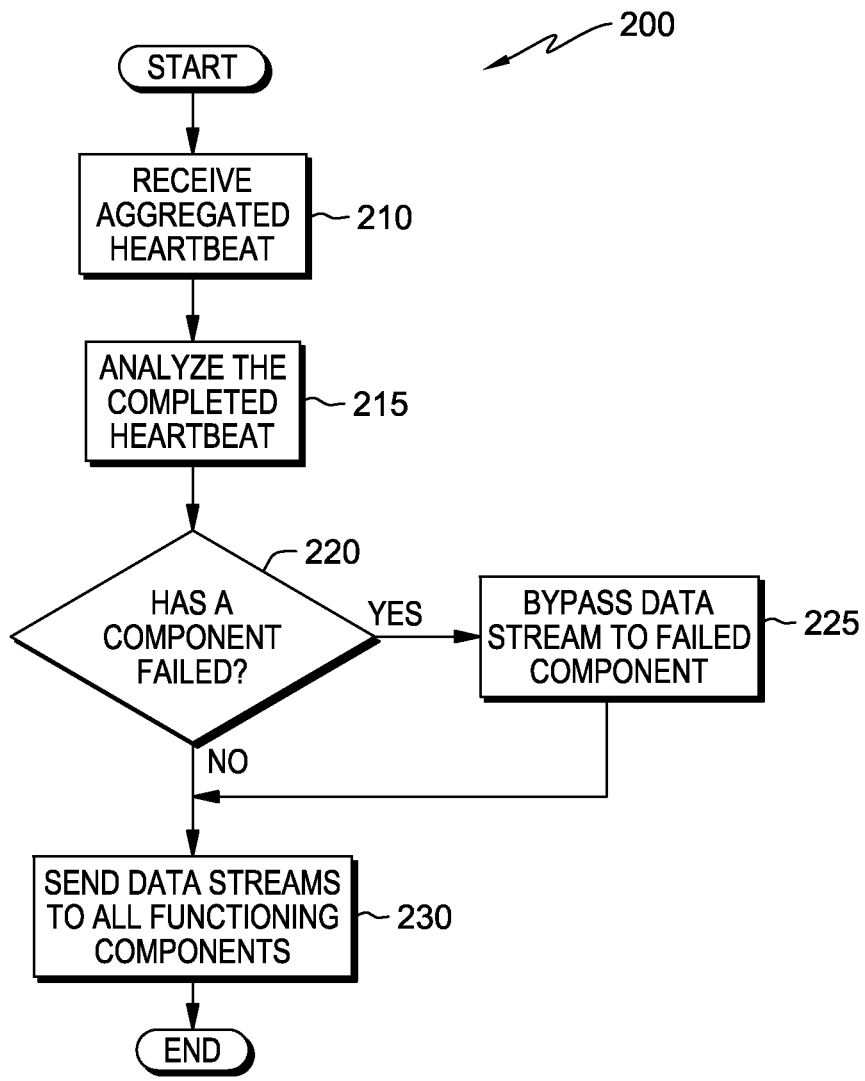
FIG. 2 is a flowchart depicting operational steps of a heartbeat monitor operating on a server computing device within the data processing environment of FIG. 1, for generating a set of heartbeat messages, in accordance with an embodiment of the present invention.

FIG. 2 is a flowchart, 200, depicting operational steps of heartbeat monitor 115 for monitoring a hierarchy of software components executing on computer hardware, in accordance with an embodiment of the present invention.

In this exemplary embodiment, heartbeat monitor 115 receives an aggregated heartbeat, in step 210. Each heartbeat monitor at each nested level adds their respective aggregated information to that heartbeat and resets or recovers the respective entities that heartbeat the heartbeat monitors, e.g., software that are under the control of a given heartbeat monitor. For example, at heartbeat monitor 142, the flow identifiers carried in the slots of the heartbeat include data for guest operating system 150, MRTE 155, application server 160 and 170, and application 164, 166, 174, and 176. Therefore, when the heartbeat is received by heartbeat monitor 115 all of the components included in the hierarchy have had their respective data added to the heartbeat, if they are functioning.

In step 215, heartbeat monitor 115 analyzes the completed heartbeat and identifies any network flows that have failed. The analysis consists of determining whether or not the flow identifiers in the slots of the completed heartbeat include all the data that corresponds to the components of the hierarchical system. For example, a heartbeat in this exemplary embodiment includes four slots, with each slot being assigned to a different application of a hierarchical system. Heartbeat monitor 115 receives a completed heartbeat that includes data from only three of the four components. Based on this information, heartbeat monitor 115 identifies and flags the data stream, which corresponds to the empty slot, as failed.

In decision step 220, heartbeat monitor 115 determines if any components have failed based on the analysis of step 215. If a component has failed (decision step 220, yes branch), then heartbeat monitor 115 bypasses the data stream to the failed component, in step 225.

If a component has not failed (decision step 220, no branch), then heartbeat monitor 115 proceeds to step 230. In step 230, heartbeat monitor 115 sends data streams to all functioning components in the hierarchical system.

Figure 3:
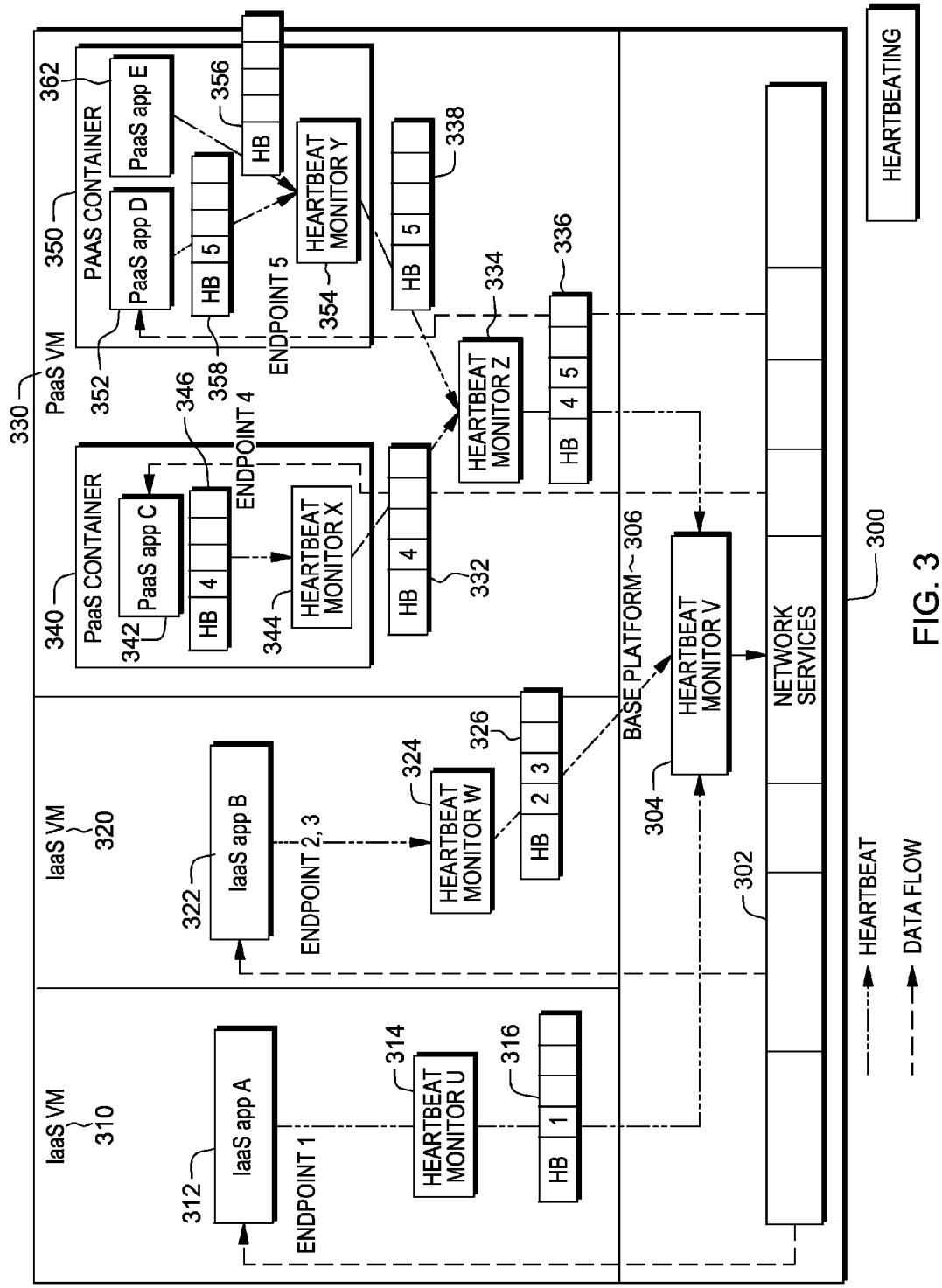
FIG. 3 is a block diagram illustrating a data flow of a software hierarchy that is functioning as intended, in accordance with an embodiment of the present invention.
Figure 4:
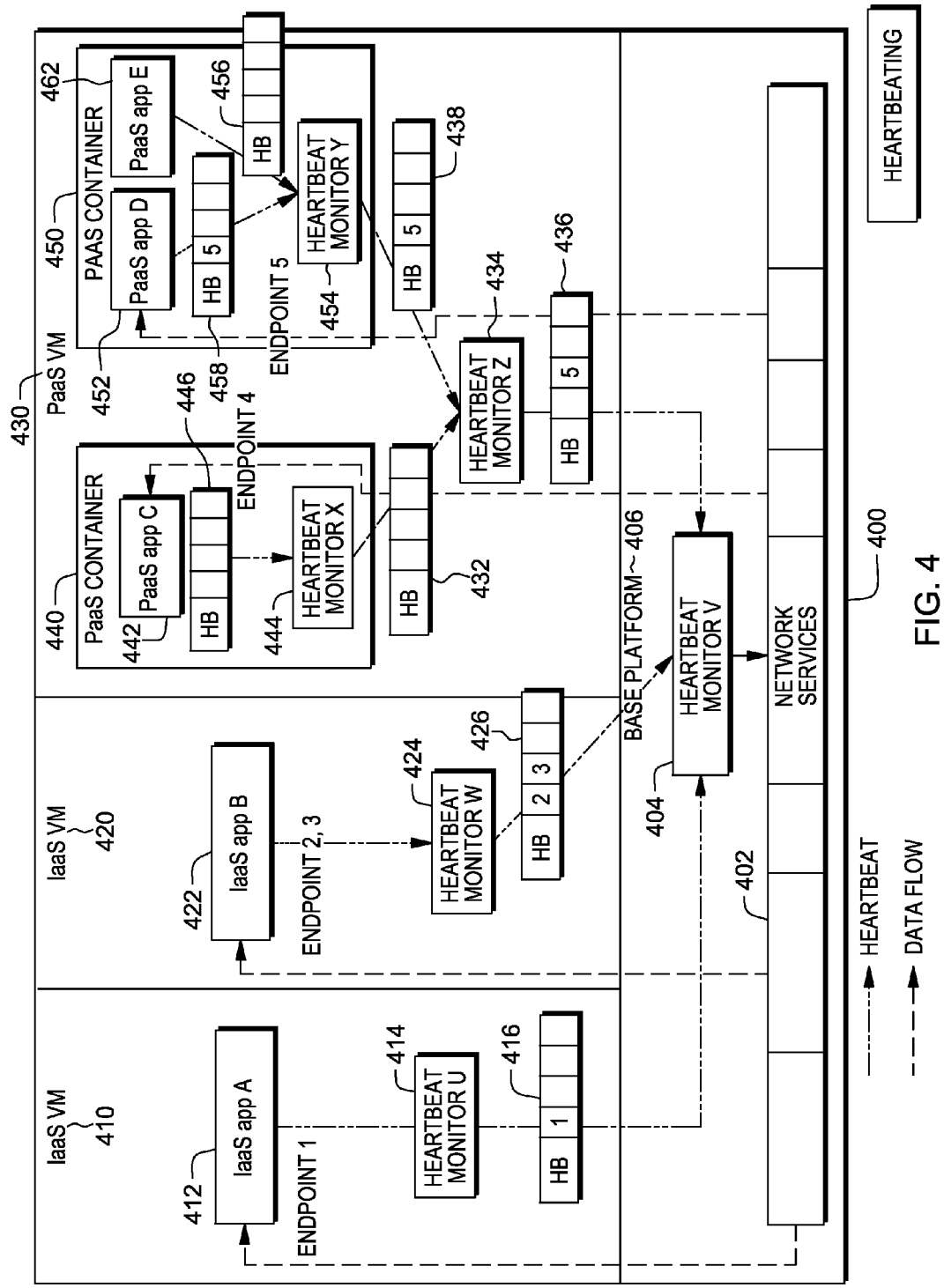
FIG. 4 is a block diagram illustrating a data flow of a software hierarchy that includes a program that is not functioning as intended, in accordance with an embodiment of the present invention.

FIGS. 3 and 4 respectively include diagrams illustrating an exemplary heartbeat messages that is sent from an application within the system. As depicted, respective heartbeat messages 316, 326, 332, 336, 338, 416, 426, 432, 436, and 438 include a respective heartbeat identifier, e.g., in the slot shown as containing HB. The respective heartbeat messages also include a set of endpoint slots following the heartbeat identifier that can hold the flow identifier belonging to an endpoint. In exemplary embodiments, the set of flow identifiers can be either a fixed number or a variable number.

Referring now to FIG. 3, FIG. 3 is a block diagram, 300, illustrating the data flow of a software hierarchy that is functioning as intended, in accordance with an exemplary embodiment of the present invention. In normal operation, applications 312, 322, 342, 352, and 362 and containers 310, 320, and 330 are running on system 300 within a base platform 306. During normal operation, applications 312, 322, 342, 352, and 362 send heartbeat messages at regular timed intervals to a corresponding heartbeat monitor 304, 314, 324, 334, 344, and 354. In one example, the heartbeat messages are sent every one second. However, in other examples, the heartbeat messages may be sent at any other predetermined interval, or corresponding to predetermined events that occur.

In an example, IaaS application B 322 sends a regular heartbeat message to heartbeat monitor W 324, and IaaS application A 312 sends a regular heartbeat message to heartbeat monitor U 314. In the example, heartbeat message 326 includes a list of flow indicators; hereafter called endpoints, and used by application B 322, in this case endpoint 2 and endpoint 3, and heartbeat message 316 includes endpoint 1, and used by application A 312. In exemplary embodiments, heartbeat monitors receive heartbeat messages and immediately send heartbeat messages with the full list of endpoints that each heartbeat monitor is monitoring. In this example, heartbeat monitor W 324 receives heartbeat message 326 and immediately sends heartbeat message 326 with the full list of endpoints, in this case endpoints 2 and 3, to heartbeat monitor V 304. Heartbeat monitor V 304 determines that endpoints 2 and 3 are still active, as well as IaaS VM 320 when heartbeat monitor V 304 receives heartbeat message 326 from heartbeat monitor W 324.

In another example, PaaS application C 342 sends a regular heartbeat message to heartbeat monitor X 344. In this example heartbeat message includes a list of endpoints used by PaaS application C 342, in this case endpoint 4. In exemplary embodiments, heartbeat monitors receive heartbeat messages and immediately send heartbeat messages with the full list of endpoints that each heartbeat monitor is monitoring. In this example, heartbeat monitor X 344 receives heartbeat message 346 and immediately send heartbeat message 346 with the full list of endpoints, in this case endpoint 4, to heartbeat monitor Z 334. Heart monitor Z 334 determines that endpoint 4 is still active, as well as PaaS container 340 is still active when heartbeat monitor Z 334 receives heartbeat message 346. Similarly, heartbeat monitor Z 334 determines that endpoint 5 and PaaS container 350 are still active when heartbeat monitor Z 334 receives heartbeat message 338, which includes the respective information of heartbeat 358 and 356. If a component, such as an application etc., was not functioning properly, then heartbeat monitor V 304 would determine that the endpoint corresponding to the malfunctioning component was missing. Heartbeat monitor V 304 would then send a message to network services component 302 to ensure that the data stream to endpoint of the malfunctioning component is bypassed.

Referring now to FIG. 4, FIG. 4 is a block diagram, 400, illustrating a data flow of a software hierarchy that includes a program that is not functioning as intended, in accordance with an exemplary embodiment of the present invention. An example of the operation of the system will be discussed when an application fails. In normal operation, applications 412, 422, 442, 452, and 462 and containers 410, 420, and 430 are running on system 400 within a base platform 406. During normal operation, applications 412, 422, 442, 452, and 462 send heartbeat messages at regular timed intervals to a corresponding heartbeat monitor 404, 414, 424, 434, 444, and 454. In the example, heartbeat message 426 includes endpoints 2 and 3 used by application B 422, and heartbeat message 416 includes endpoint 1, and used by application A 412. Heartbeat monitor Z 434 determines that endpoint 5 and PaaS container 450 are still active, when heartbeat monitor Z 434 receives heartbeat message 438, which includes the respective information of heartbeat 458 and 456. In one example, the heartbeat messages are sent every one second. However, in other examples, the heartbeat messages may be sent at any other predetermined interval, or corresponding to predetermined events that occur.

In this example, PaaS application C 442 fails. In this scenario, heartbeat messages sent from PaaS application C 442 to heartbeat monitor X 444 cease when PaaS application C 442 fails. Heartbeat monitor X 444 detects the missing flow indicator in heartbeat message 446. After a predefined number of missing heartbeat messages, heartbeat monitor X 444 determines that PaaS application C 442 has failed. In an example, heartbeat monitor X 444 determines that PaaS application C 442 has failed after three consecutive heartbeat messages are missed. In another example, a percentage of missed heartbeat messages may be used to determine if an application has failed. In one example, if 9 out of the past 10 heartbeat messages from PaaS application C 442 to heartbeat monitor X 444 are missing, heartbeat monitor X 444 determines that PaaS application C 442 has failed.

In this example, once heartbeat monitor X 444 determines that PaaS application C 442 has failed, heartbeat monitor X sends a request to initiate restart of PaaS application C 442. Additionally, heartbeat monitor X 444 sends a heartbeat message, depicted as heartbeat message 432, to heartbeat monitor Z to indicate that PaaS container 440 is still operational. However, differing from what is depicted in FIG. 3, since PaaS application C 442 has failed, heartbeat message 432 does not include any flow indicators, hereafter called endpoints, that indicate PaaS application C 442 is functioning as intended, i.e., normally. In this case, heartbeat message 432 sent from heartbeat monitor X 444 to heartbeat monitor Z 434 is empty. When heartbeat monitor Z 434 receives an empty heartbeat message, heartbeat monitor Z 434 determines that PaaS container 440 is still active, and heartbeat monitor Z 434 will not try to restart PaaS container 440. Heartbeat monitor Z 434 sends a heartbeat message 436 to heartbeat monitor V 404 with a list of currently active endpoints. In this example, heartbeat message 436 includes only endpoint 5, as PaaS application C 442 has failed. Heartbeat monitor V 404 receives heartbeat message 436 with only endpoint 5. Heartbeat monitor V 404 determines that endpoint 4 is no longer active, as endpoint 4 is missing in the heartbeat message 436. Once heartbeat monitor V 404 determines that endpoint 4 is missing, heartbeat monitor V 404 sends a message to network services component 402 to ensure that the data stream to endpoint 4 is bypassed. In one example, heartbeat monitor V 404 initiates a sequence to re-route the data stream entering endpoint 4 to another viable application.

In this example, once heartbeat monitor X 444 determines that endpoint 4 is no longer active and PaaS application C 442 has failed, heartbeat monitor X attempts to restart PaaS application C 442.

If the attempt to restart PaaS application C 442 is successful, PaaS application C 442 re-registers with network services component 402 to enable endpoint 4. Furthermore, Paas application C 442 starts sending heartbeat messages to heartbeat monitor X 444. If the attempt to restart PaaS application C 442 fails, then heartbeat monitor X 444 determines what action to take next depending on a configuration setting determined by a business decision. In one example, heartbeat monitor X 444 logs the error into a storage device and/or attempts to restart PaaS application C 442 again.

In another example, heartbeat monitor X 444 escalates the failure and stops sending heartbeat messages to heartbeat monitor Z 434. Heartbeat monitor Z 434 detects missing heartbeat messages from PaaS container 440, and after a predefined number of missing heartbeat messages, heartbeat monitor Z 434 determines that PaaS container 440 has failed. In an example, heartbeat monitor Z 434 determines that PaaS container 340 has failed after three consecutive heartbeat messages are missed. In another example, a percentage of missed heartbeat messages may be used to determine if an application has failed. In one example, if 9 out of the past 10 heartbeat messages from heartbeat monitor X 444 to heartbeat monitor Z 434 are missing, heartbeat monitor Z 434 determines that PaaS container 440 has failed.

Heartbeat monitor Z 434 continues to send heartbeat messages to heartbeat monitor V 404, but the heartbeat messages will only include endpoints from containers that are still operating. So, in this example, heartbeat monitor Z 434 continues to send heartbeat messages to heartbeat monitor V 404 that include endpoint 5. It is to be noted that network services component 402 already knows that endpoint 4 has failed from the earlier heartbeat messages. Heartbeat monitor Z 434 attempts to restart PaaS container 440. When heartbeat monitor Z 434 attempts to restart PaaS container 440, the attempt to restart stops and restarts any PaaS applications running in PaaS container 440. In this example, heartbeat monitor Z 434 attempts to restart PaaS application C 442. If the restart is successful, PaaS applications running on the PaaS containers will re-register with the network services component. In this example, if PaaS application C 442 is successful in restarting, PaaS application C 442 re-registers with network services component 402 to endpoint 4. At this time, PaaS application C 442 starts sending heartbeat messages again to heartbeat monitor X 444 that include endpoint 4.

If the restart of the PaaS container fails, then the heartbeat monitor determines what action to take next depending on a configuration setting determined by a business decision. In an example, if PaaS container 440 fails, then heartbeat monitor Z 434 logs the error into a storage device and/or attempts to restart PaaS container 440 again.

In another example, heartbeat monitor Z 434 escalates the failure and stops sending heartbeat messages to heartbeat monitor V 404. Heartbeat monitor V 404 detects missing heartbeat messages from PaaS VM 430, and after a predefined number of missing heartbeat messages, heartbeat monitor V 404 determines that PaaS VM 430 has failed. In an example, heartbeat monitor V 404 determines that PaaS VM 430 has failed after three consecutive heartbeat messages are missed. In another example, a percentage of missed heartbeat messages may be used to determine if an application has failed. In one example, if 9 out of the past 10 heartbeat messages from heartbeat monitor Z 434 to heartbeat monitor V 404 are missing, heartbeat monitor V 404 determines that PaaS VM 430 has failed.

It is to be noted that network services component 402 already knows that endpoint 4 has failed from the earlier heartbeat messages. Heartbeat monitor V 404 attempts to restart PaaS VM 430. When heartbeat monitor V 404 attempts to restart PaaS VM 430, the attempt to restart stops and restarts any PaaS container running in PaaS VM 430. In this example, heartbeat monitor V 404 attempts to restart PaaS container 440 and PaaS container 450, along with corresponding PaaS applications C, D and E 442, 452, and 462. If the restart of PaaS VM 430 is successful, PaaS applications running on the PaaS containers will re-register with the network services component. In this example, if PaaS VM 430 is successful in restarting, PaaS applications C, D and E 442, 452, and 462 re-register with network services component 402 to endpoints 4 and 5. At this time, PaaS application C 442 starts sending heartbeat messages again to heartbeat monitor X 444 that include endpoint 4 and PaaS application D starts sending heartbeat messages again to heartbeat monitor Y that includes endpoint 5.

If the restart of the PaaS VM fails, then the heartbeat monitor determines what action to take next depending on a configuration setting determined by a business decision. In an example, if PaaS VM 430 fails to restart successfully, then heartbeat monitor V 404 logs the error into a storage device and/or attempts to restart PaaS VM 430 again. In another example, heartbeat monitor V 404 signals a restart of entire system 400.

In exemplary embodiments, the applications can process flows of data via one or more endpoints that the applications expose. Applications may run as programs in an IaaS VM (called IaaS applications) or as applications running in a container (called PaaS applications). Exemplary embodiments are not limited to IaaS and PaaS applications. Exemplary embodiments may be applicable for any type of container hierarchy.

Figure 5:
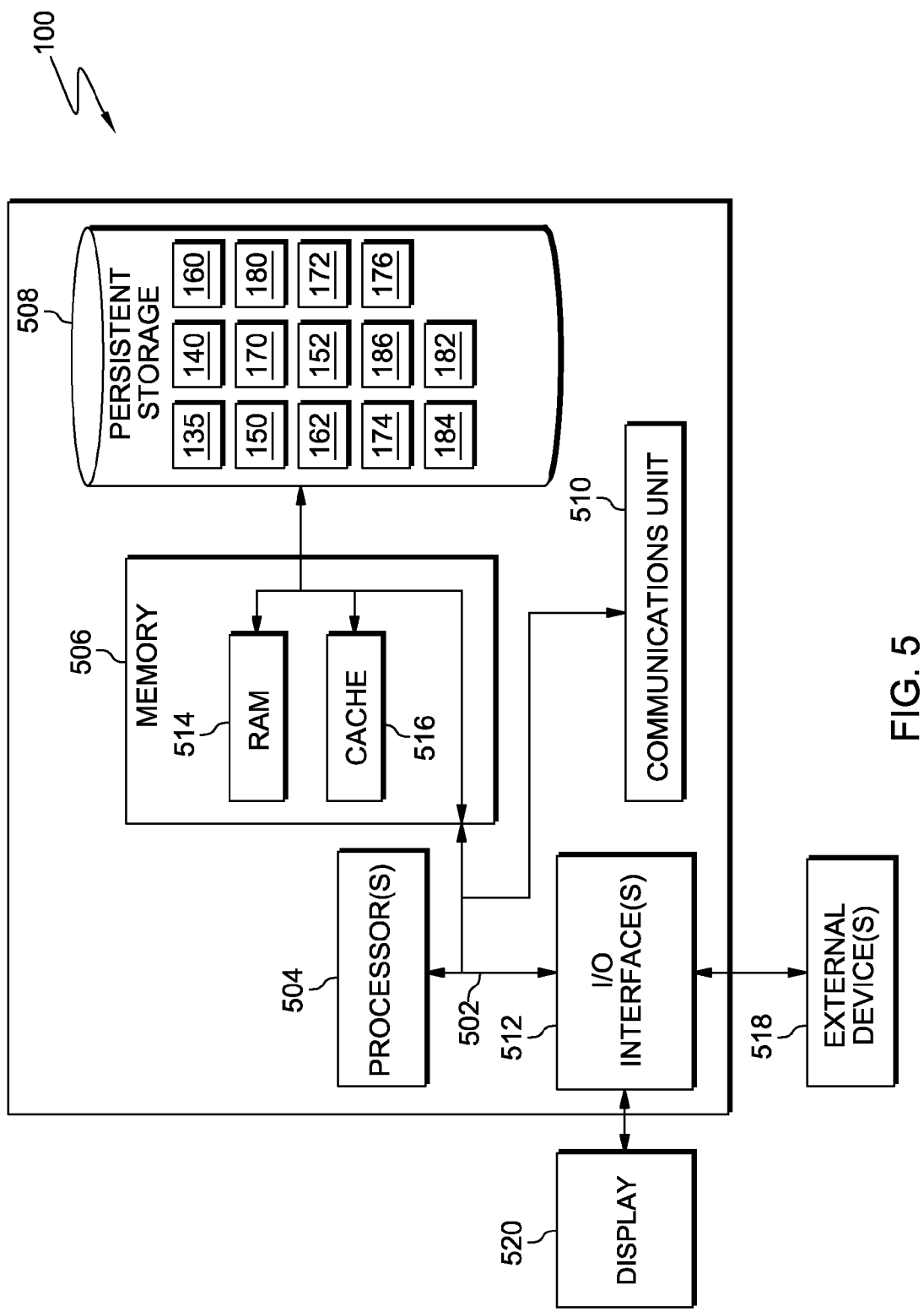
FIG. 5 depicts a block diagram of the components of the server computing device, in accordance with an embodiment of the present invention.

FIG. 5 depicts a block diagram of the components of server computing device 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computing device 110 includes: communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Network services 125, host operating system 120, VMM 130, virtual machine 140, guest operating system 150, MRTE 155, application server 160, application server 170, application 164, application 166, application 174, application 176, and heartbeat monitor 115, 152, 157, 162 and 172 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network services 125, host operating system 120, VMM 130, virtual machine 140, guest operating system 150, MRTE 155, application server 160, application server 170, application 164, application 166, application 174, application 176, and heartbeat monitor 115, 152, 157, 162 and 172. In these examples, communications unit 510 includes one or more network interface cards. Communications unit 510 may provide communications through the use of either or both physical and wireless communications links. Network services 125, heartbeat monitor 115, host operating system 120, VMM 130, virtual machine 140, guest operating system 150, MRTE 155, application server 160, application server 170, application 164, application 166, application 174, application 176, and heartbeat monitor 132, 142, 152, 157, 162 and 172 may be downloaded to persistent storage 508 through communications unit 510.

I/O interface(s) 512 allows for input and output of data with other devices that may be respectively connected to server computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., network services 125, host operating system 120, VMM 130, virtual machine 140, guest operating system 150, MRTE 155, application server 160, application server 170, application 164, application 166, application 174, application 176, and heartbeat monitor 115, 152, 157, 162 and 172 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of monitoring computer components of a hierarchical container-based software system executing on computer hardware, the computer components including at least one of, one or more application programs and one or more operating systems, the hierarchical container-based software system including a network of data flows being routed through the hierarchy of computer components, the method comprising:
   a computer receiving an aggregation of single reset and network flow heartbeat messages from each level of the hierarchy indicating whether computer components at each respective hierarchy level are functioning correctly, the aggregation of single reset and network heartbeat messages including both computer component reset information and network data flow information;
   the computer determining if the aggregation of single reset and network heartbeat messages includes a first single reset and network heartbeat message indicating that a first computer component at a first level of the hierarchy is functioning correctly;
   responsive to the determination that the first single reset and network heartbeat message includes the indication that the first computer component is functioning correctly, the computer routing network data flows to the first computer component;
   responsive to the determination that the first single reset and network heartbeat message does not include the indication that the first computer component is functioning correctly, the computer determining that the first computer component has failed; and
   the computer initiating restart of all computer components in hierarchal levels below the first hierarchical level.

2. The method of claim 1, wherein if the first computer component is functioning correctly, the network data flow information indicates that the network data flows to the first computer component should be sustained.

3. The method of claim 1, the method further comprising:
   responsive to the determination that the first computer component has failed; the computer redirecting the data stream to a second computer component or to an application endpoint, wherein the application endpoint is a point of termination or completion in a computational process.

4. The method of claim 1, the method further comprising:
   responsive to the determination that the first computer component has failed; the computer initiating a restart of the first computer component.

5. The method of claim 1, the method further comprising:
   the computer determining if the aggregation of single reset and network heartbeat messages does not include a single reset and network heartbeat message indicating whether a second computer component at a second level of the hierarchy is functioning correctly responsive to the determination that the aggregation of heartbeat messages does not include a heartbeat message indicating whether the second computer component is functioning correctly, the computer determining if a threshold number of heartbeat messages have not been received with the indication whether the second computer component is functioning correctly; and
   responsive to the determination that the threshold number of heartbeat messages have not been received with the indication whether the second computer component is functioning correctly, the computer determining that the second computer component has failed.

6. The method of claim 1, wherein if the first computer component is not functioning correctly, the network data flow information indicates that the network data flows to the first computer component should be bypassed.

7. The method of claim 2, wherein the network data flow information indicates that the network data flows to the first computer component should be sustained comprises placing a network data flow identifier in a slot of the network heartbeat message.

8. The method of claim 6, wherein if the first computer component is not functioning correctly, the network data flow information indicating that the network data flows to the first computer component should be bypassed comprises a slot in the network heartbeat message for the first computer component not having a network data flow identifier.

9. The method of claim 6, wherein all network data flows for the first hierarchal level are bypassed and all network data flows in hierarchal levels below the first hierarchical level are bypassed.

10. A non-transitory computer program product for monitoring computer components of a hierarchical container-based software system executing on computer hardware, the computer components including at least one of, one or more application programs and one or more operating systems, the system including a network of data flows being routed through the hierarchy of computer components, the computer program product comprising:
one or more computer-readable storage media and program instructions stored on the one or more computer-readable storage media, the program instructions comprising:
program instructions to receive an aggregation of single reset and network flow heartbeat messages from each level of the hierarchy indicating whether computer components at each respective hierarchy level are functioning correctly, the aggregation of single reset and network heartbeat messages including both computer component reset information and network data flow information;
program instructions to determine if the aggregation of single reset and network heartbeat messages includes a first single reset and network heartbeat message indicating that a first computer component at a first level of the hierarchy is functioning correctly;
program instructions to respond to the determination that the first single reset and network heartbeat message includes the indication that the first computer component is functioning correctly, by routing network data flows to the first computer component;
program instructions to respond to the determination that the first single reset and network heartbeat message does not include the indication that the first computer component is functioning correctly, by determining that the first computer component has failed; and
program instructions to initiate restart of all computer components in hierarchal levels below the first hierarchical level.

11. The non-transitory computer program product claim 10, wherein if the first computer component is functioning correctly, the network data flow information indicates that the network data flows to the first computer component should be sustained.

12. The non-transitory computer program product of claim 10, further comprising:
responsive to the determination that the first single reset and network heartbeat message does not include the indication that the first computer component is functioning correctly, program instructions to determine that the first computer component has failed.

13. The non-transitory computer program product of claim 12, further comprising:
responsive to the determination that the first computer component has failed; program instructions to redirect the data stream to a second computer component or to an application endpoint, wherein the application endpoint is a point of termination or completion in a computational process.

14. The non-transitory computer program product of claim 12, further comprising:
responsive to the determination that the first computer component has failed; program instructions to initiate a restart of the first computer component.

15. The non-transitory computer program product of claim 10, further comprising:
program instructions to determine if the aggregation of single reset and network heartbeat messages does not include a single reset and network heartbeat message indicating whether a second computer component at a second level of the hierarchy is functioning correctly responsive to the determination that the aggregation of heartbeat messages does not include a heartbeat message indicating whether the second computer component is functioning correctly, program instructions to determine if a threshold number of heartbeat messages have not been received with the indication whether the second computer component is functioning correctly; and
responsive to the determination that the threshold number of heartbeat messages have not been received with the indication whether the computer component is functioning correctly, program instructions to determine that the second computer component has failed.

16. The non-transitory computer program product of claim 12, wherein if the first computer component is not functioning correctly, the network data flow information indicates that the network data flows to the first computer component should be bypassed.

17. A computer system for monitoring computer components of a hierarchical container-based software system executing on computer hardware, the computer components including at least one of, one or more application programs and one or more operating systems, the system including a network of data flows being routed through the hierarchy of computer components, the computer system comprising:
one or more computer processors;
one or more computer-readable storage media;
program instructions stored on the computer-readable storage media for execution by at least one of the one or more processors, the program instructions comprising:
program instructions to receive an aggregation of single reset and network flow heartbeat messages from each level of the hierarchy indicating whether computer components at each respective hierarchy level are functioning correctly, the aggregation of single reset and network heartbeat messages including both computer component reset information and network data flow information;
program instructions to determine if the aggregation of single reset and network heartbeat messages includes a first single reset and network heartbeat message indicating that a first computer component at a level of the hierarchy is functioning correctly;
program instructions to respond to the determination that the first single reset and network heartbeat message includes the indication that the first computer component is functioning correctly, by routing network data flows to the first computer component;
program instructions to respond to the determination that the first single reset and network heartbeat message does not include the indication that the first computer component is functioning correctly, by determining that the first computer component has failed; and program instructions to initiate restart of all computer components in hierarchal levels below the first hierarchical level.

18. The computer system of claim 17, wherein if the first computer component is functioning correctly, the network data flow information indicates that the network data flows to the first computer component should be sustained.

19. The computer system of claim 17, further comprising: responsive to the determination that the first computer component has failed; program instructions to redirect the data stream to a second computer component or to an application endpoint, wherein the application endpoint is a point of termination or completion in a computational process.

20. The computer system of claim 17, further comprising: responsive to the determination that the first computer component has failed; program instructions to initiate a restart of the computer component program.

21. The computer system of claim 17, further comprising: program instructions to determine if the aggregation of single reset and network heartbeat messages does not include a single reset and network heartbeat message indicating whether a second computer component at a second level of the hierarchy is functioning correctly responsive to the determination that the aggregation of heartbeat messages does not include a heartbeat message indicating whether the second computer component is functioning correctly, program instructions to determine if a threshold number of single reset and network heartbeat messages have not been received with the indication whether the second computer component is functioning correctly; and responsive to the determination that the threshold number of heartbeat messages have not been received with the indication whether the second computer component is functioning correctly, program instructions to determine that the second computer component has failed.

22. The computer system of claim 17, wherein if the first computer component is not functioning correctly, the network data flows to the first computer component should be bypassed.

23. The computer system of claim 18, wherein the network data flow information indicates that the network data flows to the first computer component should be sustained comprises placing a network data flow identifier in a slot of the network heartbeat message.

24. The computer system of claim 22, wherein if the first computer component is not functioning correctly, the network data flow information indicating that the network data flows to the first computer component should be bypassed comprises a slot in the network heartbeat message for the first computer component not having a network data flow identifier.

25. The computer system of claim 22, wherein all network data flows for the first hierarchal level are bypassed and all network data flows in hierarchal levels below the first hierarchical level are bypassed.

* * * * *